Sept. 2, 1969 E. R. BOODMAN ETAL 3,464,108

METHOD OF MAKING COMMUTATOR DISCS

Filed Dec. 8, 1965

EMIL R. BOODMAN
DOUGLAS R. MC GUIRE
EMERSON B. WILCE
INVENTORS

BY Frederic P Smith

ATTORNEY

United States Patent Office 3,464,108

Patented Sept. 2, 1969

3,464,108

METHOD OF MAKING COMMUTATOR DISCS

Emil R. Boodman, Los Angeles, Douglas McGuire, Altadena, and Emerson B. Wilce, Los Angeles, Calif., assignors to Litton Systems, Inc., Beverly Hills, Calif.

Filed Dec. 8, 1965, Ser. No. 513,900

Int. Cl. H01r *43/00;* H02k *13/04*

U.S. Cl. 29—597 7 Claims

ABSTRACT OF THE DISCLOSURE

A method of forming a commutator disc including the steps of forming a registration hole in a supporting substrate; inserting a plastic plug in said registration hole; placing a layer of conductive material on said supporting substrate; placing a masking material on said layer of conductive material in registration with said registration hole to leave exposed only preselected portions of said conductive material; removing said plastic plug; removing unmasked portions of said layer of said conductive material to form a commutator pattern; removing said masking material; inserting a preformed commutator hub into said registration hole; and bonding said preformed commutator hub to said commutator pattern to prevent the relative motion thereof and to provide support thereto.

Figure 1:
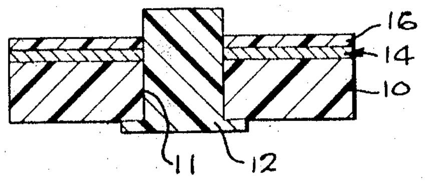

This invention relates in general in commutators for shaft encoders and in particular to a novel method of fabricating a commutator disc.

As is well known in the prior art, an analog signal in the form of a shaft rotation can be converted to a digital form by means of a rotational shaft encoder. Basically, the encoder includes a rotating commutator disc having a separate annular track for each binary digit of the digital number to be represented. Each annular track in turn consists of separate segments or areas which are representative of the value of the binary digit represented by the particular annular track. In the majority of encoders, the areas comprising the annular rings are either electrically conductive or non-conductive. The presence of a conductive or non-conductive area can be detected by a variety of means, such as current-carrying contact brush or by a variable reluctance detector coupled to a high Q electrical circuit. In this manner, the value of each digit of the binary number which is representative of the shaft position can be determined and, by connecting an electrical conductor to each of the detectors, the binary number can be applied to a digital computer or other apparatus.

Since there must be a separate annular ring for each binary digit of the number to be converted into digital form, a large number of rings is required on an encoder disc which is utilized for generating a digital number of large magnitude or high accuracy. In the utilization of prior art techniques, however, it has been found that the small dimensional tolerances allowable in the manufacture of a commutator disc make it extremely difficult to manufacture a reasonably sized disc having a large number of annular rings. These prior art techniques have generally applied a commutator pattern by means of metallic masks, silk screening, and/or photo resist processes. While these techniques are inherently sound, nonetheless a great amount of difficulty has been experienced in obtaining absolute concentricity of the commutator pattern with respect to the axis of the commutator disc and, more particularly, in obtaining good registration of the masks used in the various techniques with either the center of the commutator disc or with registration marks thereon.

The present invention has succeeded in overcoming the above-mentioned disadvantages by providing an improved method of manufacturing a commutator disc in which a conductive commutator pattern is formed on a supporting substrate in registration with a hole formed in the supporting substrate; a preformed commutator hub is then inserted into the registration hole, thus assuring perfect concentricity and registration of the conductive commutator pattern with respect to the preformed commutator hub and, thus, the axis of the commutator disc.

It is therefore the primary object of the present invention to provide a new and improved method of manufacturing a commutator disc.

It is another object of the present invention to provide an improved method of making a commutator disc which insures absolute concentricity of the commutator pattern thereon.

It is a further object of the present invention to provide an improved method of fabricating a commutator disc which greatly simplifies the registration process in placing a commutator pattern thereon.

It is still another object of the present invention to provide a method of manufacturing a commutator disc which utilizes a registration hole with which the commutator pattern is aligned and into which a preformed commutator hub is inserted.

The novel features which are believed to be characteristic of the invention, both as to its organization and method of operation, together with further objects and advantages thereof, will be better understood from the following description considered in connection with the accompanying drawings. It is to be expressly understood, however, that the drawings are for purposes of illustration and description only, and are not intended as a definition of the limits of the invention.

Figure 3:
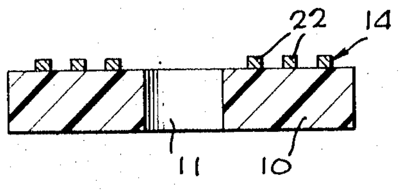
Figure 4:
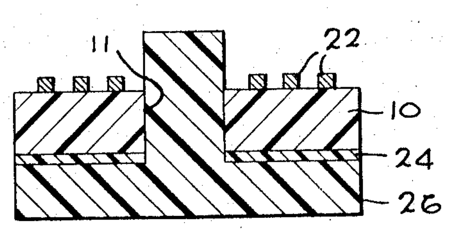
Figure 5:
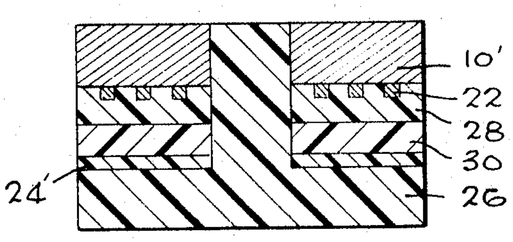
Figure 6:
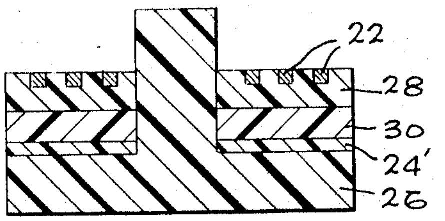

FIGURES 1 through 4 illustrate a preferred embodiment of a method of manufacturing a commutator disc according to the present invention; and FIGURES 5 and 6 in conjunction with FIGURES 1 through 4 illustrate a second method of manufacturing a commutator disc in accordance with the teachings of the present invention.

In the description of the invention to follow, corresponding reference numerals have been carried forward throughout the figures to designate like parts of the invention.

In FIGURE 1, a supporting substrate 10, generally composed of non-conductive material, is shown having a registration hole 11 formed therethrough by drilling, etching or punching techniques. The substrate 10 has a layer of conductive material 14, such as copper, placed thereon; the conductive material 14 may be deposited by vacuum deposition, may be rolled thereon, or may be plated by electro- or electroless-plating techniques. The layer 14 has, in this embodiment of the process, a layer of photosensitive material 16 (generally termed in the art as "photoresist") placed thereon. A plastic plug 12 is shown heated in the registration hole 11 to prevent the conductive material 14 or the photosensitive material 16 from flowing therein.

Figure 2:
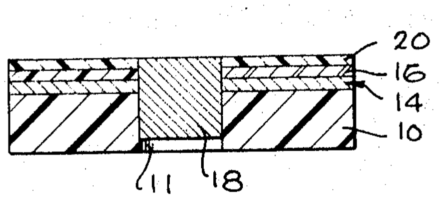

In FIGURE 2, the supporting substrate 10, the conductive layer 14, and the photosensitive layer 16 have placed thereon a phototransparency 20 which has on it a negative of the commutator pattern to be placed on the commutator disc. The phototransparency 20 has a registration hole therein and is aligned with respect to the registration hole 11 by means of a registration pin 18. The phototransparency 20 is then illuminated to expose portions of the photosensitive layer 16. The exposed portions of the photosensitive layer 16 are then dissolved by a suitable developing solution and the unmasked portions of conductive layer 14 are etched away to form commutator pattern 22. At this point in the process, the structure is as shown in FIGURE 3, comprising supporting substrate 10 and conductive pattern 22.

The final steps in the process result in the configuration shown in FIGURE 4. A preformed commutator hub 26 is inserted into the registration hole 11 and is bonded to the commutator pattern 22 (via the substrate 10) by means of a bonding layer 24 which may comprise, for example, an epoxy material. The preformed commutator hub 26 may consist of a conductive or a nonconductive material. The preformed commutator hub 26 is affixed to the commutator pattern 22 to prevent any relative motion between the two and provides additional support in those cases where the supporting substrate 10 is extremely thin and/or extremely fragile. Although the resulting surface of the commutator disc is not smooth, such a surface is perfectly adequate for a non-contact type of encoder in which the presence and absence of conductive or magnetic material is the crucial factor.

An alternative method of manufacture to obtain a smooth surface is shown in FIGURES 5 and 6. The commutator hub 26 is affixed to the commutator pattern 22 (shown inverted along with substrate 10') by means of epoxy layers 24' and 28 and bulk insulating layer 30. It is apparent, however, that the bulk insulating layer 30 and the epoxy layer 24', while providing additional electrical isolation between the commutator hub 26, if metallic, and the commutator pattern 22, are not essential in the fabrication of the commutator disc. The substrate 10' (which may be stainless steel for this embodiment of the process) is then removed by, for example, temperature cycling the entire structure to shock the substrate 10' and the commutator pattern 22 apart, leaving the finished commutator disc shown in FIGURE 5. In this method of manufacture, it would be preferable to insure that a nonmetallurgical bond existed between the substrate 10' and the commutator pattern 22.

Having described the invention, it is apparent that numerous modifications and departures may be made by those skilled in the art and that the final configuration of the commutator disc may be made by processes having numerous variations thereto. Therefore, the invention herein described is to be construed as limited only by the spirit and scope of the appended claims.

What is claimed is:

1. The method of fabricating a commutator disc comprising the steps of: forming a registration hole in a supporting substrate; inserting a plastic plug in said registration hole; plating a layer of conductive material on said supporting substrate; placing a masking material on said layer of conductive material in registration with said registration hole to leave exposed only preselected portions of said layer of conductive material; removing said plastic plug; removing the unmasked portions of said layer of conductive material to form a commutator pattern as part of a commutator pattern assembly; removing said masking material; inserting a preformed commutator hub having a disc-shaped head, wherein said head has two faces which lie in planes substantially parallel to the commutator pattern when assembled therewith, into said registration hole; and bonding one of said faces to said commutator pattern assembly to prevent the relative motion thereof and to provide support thereto.

2. The method of making a commutator disc comprising the steps of: forming a registration hole in a supporting substrate; inserting a plastic plug in said registration hole; plating a layer of conductive material on said supporting substrate; placing a layer of photosensitive material on said conductive layer; removing said plastic plug; placing a phototransparency over said photosensitive layer, said phototransparency having a registration hole therein; inserting a registration pin through said registration holes; illuminating said phototransparency; removing said registration pin; removing the unexposed portions of said photosensitive material; removing the unmasked portions of said conductive material to form a commutator pattern as part of a commutator pattern assembly; removing the remainder of said photosensitive material; inserting a preformed commutator hub having a disc-shaped head, wherein said head has two faces which lie in planes substantially parallel to the commutator pattern when assembled therewith, into said registration hole; and bonding one of said faces to said commutator pattern assembly.

3. The method of claim 2 wherein said preformed commutator hub is bonded directly to said supporting substrate.

4. The method of claim 2 wherein the preformed commutator hub is bonded directly to said commutator pattern and further comprising the step of removing said supporting substrate from said commutator pattern.

5. The method of forming a commutator disc comprising the steps of: forming a registration hole in a supporting substrate; placing a layer of conductive material on said supporting substrate; placing a layer of photosensitive material on said conductive layer; placing a phototransparency over said photosensitive layer, said phototransparency having a registration hole therein; inserting a registration pin through said registration holes; illuminating said phototransparency; removing said registration pin; removing the unexposed portions of said photosensitive material; removing the unmasked portions of said conductive material to form a commutator pattern as part of a commutator pattern assembly; removing the remainder of said photosensitive material; inserting a preformed commutator hub having a disc-shaped head, wherein said head has two faces which lie in planes substantially parallel to the commutator pattern when assembled therewith, into said registration hole of said substrate; and bonding one of said faces to said commutator pattern assembly.

6. The method of claim 5 wherein said preformed commutator hub is bonded directly to said supporting substrate.

7. The method of claim 5 wherein the preformed commutator hub is bonded directly to said commutator pattern and further comprising the step of removing said supporting substrate from said commutator pattern.

References Cited

UNITED STATES PATENTS

| | | | |
|---|---|---|---|
| 2,974,284 | 3/1961 | Parker. | |
| 3,151,278 | 9/1964 | Elarde | 29—627 X |
| 3,280,353 | 10/1966 | Haydon et al. | 310—268 |
| 3,332,144 | 7/1967 | Buntschuh et al. | 29—592 |

JOHN F. CAMPBELL, Primary Examiner

C. E. HALL, Assistant Examiner

U.S. Cl. X.R.

310—235, 237